US012399026B2

(12) United States Patent
Abedi et al.

(10) Patent No.: US 12,399,026 B2
(45) Date of Patent: Aug. 26, 2025

(54) ARTIFICIAL INTELLIGENCE ALGORITHM FOR IMPLEMENTING A CROWD SOURCING TRIP-PLANNING SYSTEM AND METHOD

(71) Applicant: The Auto Club Group, Dearborn, MI (US)

(72) Inventors: Shohreh Abedi, Bloomfield Hills, MI (US); Viral Patel, Canton, MI (US); Jeff Laskowski, Troy, MI (US); Sanjay Kuchipudi, Westland, MI (US); Jakob Taylor, Brooklyn, MI (US); Ericka Capers, Highland, MI (US); Luis Castro, Riverview, FL (US); Andrew Hagar, St. Petersburg, FL (US)

(73) Assignee: The Auto Club Group, Dearborn, MI (US)

( * ) Notice: Subject to any disclaimer, the term of this patent is extended or adjusted under 35 U.S.C. 154(b) by 794 days.

(21) Appl. No.: 17/221,018

(22) Filed: Apr. 2, 2021

(65) Prior Publication Data
US 2022/0316901 A1  Oct. 6, 2022

(51) Int. Cl.
*G01C 21/36* (2006.01)
*G01C 21/34* (2006.01)
(Continued)

(52) U.S. Cl.
CPC ....... *G01C 21/365* (2013.01); *G01C 21/3492* (2013.01); *G06N 20/00* (2019.01); *H04W 12/08* (2013.01)

(58) Field of Classification Search
CPC .............. G01C 21/365; G01C 21/3492; G01C 21/3476; G01C 21/3644; G01C 21/3647;
(Continued)

(56) References Cited

U.S. PATENT DOCUMENTS 136,260 A  *  2/1873  Patric ..................... A01C 7/08
111/67
8,032,296 B2  10/2011  Bucchieri
(Continued)

OTHER PUBLICATIONS

Website for "the dyrt", https://thedyrt.com/, 2021, downloaded Mar. 31, 2021, 5 pages.

*Primary Examiner* — Rodney A Butler
(74) *Attorney, Agent, or Firm* — Brooks Kushman .P.C.

(57) ABSTRACT

A trip planning and reservation system and method is disclosed that may include a U.I. software application executing on a computing device (e.g., mobile device). The U.I. software application may transmit the user account information to an external server. The external server may validate the user account information and transmit an access token to the mobile device. An AI algorithm may be operable to predict and select the plurality of digital media files based on operational data that includes the user account information and one or more user interest tags. It is contemplated that the digital media files may include geographic coordinate data and informational data about a location within a pre-defined proximity of the desired travel route. A first file may then be selected from the plurality of digital media files for inclusion within the desired travel route displayed by the U.I. software application.

20 Claims, 13 Drawing Sheets

(51) Int. Cl.
*G06N 20/00* (2019.01)
*H04W 12/08* (2021.01)

(58) Field of Classification Search
CPC .......... G06N 20/00; G06N 5/01; G06N 20/20; H04W 12/08; H04W 12/084; H04L 63/0807
See application file for complete search history.

(56) References Cited

U.S. PATENT DOCUMENTS

| | | | |
|---|---|---|---|
| 8,825,370 B2* | 9/2014 | Hu | G01C 21/343 707/999.005 |
| 9,710,873 B1* | 7/2017 | Hill | G06T 11/00 |
| 10,136,260 B2* | 11/2018 | Parulski | H04W 4/024 |
| 10,673,839 B2* | 6/2020 | Zhang | H04W 12/069 |
| 10,992,660 B2* | 4/2021 | Johansson | H04W 12/069 |
| 2014/0036022 A1 | 2/2014 | Croen et al. | |
| 2016/0109252 A1* | 4/2016 | Caine | G01C 21/3682 701/533 |
| 2017/0046802 A1* | 2/2017 | Zhang | G06Q 50/01 |

* cited by examiner

ARTIFICIAL INTELLIGENCE ALGORITHM FOR IMPLEMENTING A CROWD SOURCING TRIP-PLANNING SYSTEM AND METHOD

TECHNICAL FIELD

A system and method are disclosed for a user interface U.I. software applications (U.I.) that may employ an artificial intelligence (A.I.) algorithm to assist a user with a trip and route planning process.

BACKGROUND

User Interfaces U.I. software applications (U.I.) such as web browsers, virtual reality, or in-vehicle infotainment solutions are increasing in popularity due to the ability of users to collaboratively interact and share information. For instance, social media sites like Instagram™ and Facebook™ provide users with the ability to collaboratively share photos and videos of themselves on vacation. But there exists a need for U.I.s that may be used by a user to review and share digital photos/videos (i.e., digital media) during a route or trip planning process.

SUMMARY

A trip planning and reservation system and method is disclosed that may include a U.I. software application (e.g., web site, virtual reality, and in-vehicle infotainment displays) executing on a computing device (i.e., a trip engagement platform or mobile device). The U.I. may be operable to transmit the user account information to an external server. The external server may validate the user account information and transmit an access token to the U.I. of that device. The access token may be used by the U.I. to initiate and provide communication between the U.I. application and the external server. It is contemplated, an API gateway may be used to validate the access token thereby providing communication between the U.I. and the external server.

The API gateway may be operable to invoke and permit access by the device to a plurality of digital media files stored on the external server. The mobile device, web site, virtual reality, and in vehicle displays may further be operable to generate and provide it desired travel route between our first location and a second location that is inputted by user. In response to receiving the desired travel route, an artificial intelligence algorithm may be operable to classify and predict plurality of the digital media files which will be displayed on the U.I. The AI algorithm may be operable to predict and select the plurality of digital media files based on operational data that includes the user account information and one or more user interest tags. It is contemplated that the digital media files may include geographic coordinate data and informational data about a location within a pre-defined proximity of the desired travel route. A first file may then be selected from the plurality of digital media files for inclusion within the desired travel route displayed by the U.I.

The system and method disclosed may further generate the one or more user interest tags based on one or more searches initiated on the U.I. by user relating to the desired travel route into previously provided travel routes. Or the one or more user interest tags maybe based on one or more searches initiated on the U.I. relating to a user defined activity. It is also contemplated the operational data received by the AI algorithm further include one or more digital media files that were previously viewed on the U.I. The operational data may further include exclusion tags for prohibiting digital media identified as being unfavorable or explicit from being displayed on the U.I. The AI algorithm may also be operable to exclude digital media using historical search records that were recorded by the trip planning gateway. The AI algorithm may also include a restrictive content criteria that prohibits explicit material from being stored by the backend system or uploaded by the U.I. to the external server.

The U.I. may further be used to concatenate two or more digital photos in order to form a single video file. A trip planning gateway may append geographic coordinate locations, locational information or user account information to the single video file. It is contemplated the first file may include or relate to a lodging location (e.g., a campground, a hotel, a bed and breakfast, are the like). The lodging location may be selected based on a first predefined proximity to the second location. The trip planning platform may also provide turn by turn directions between the first location and the second location. Lastly a second file may be selected from the plurality of digital media files for use within the desired travel route. The second file may relate to an area of interest (rock climbing location, fishing location) that is within another predefined proximity of the desired travel route. Again, the second file may include geographic coordinates and the U.I. may turn provide turn by turn directions between the first location, the area of interest, and the second location.

BRIEF DESCRIPTION OF THE DRAWINGS

FIG. 3 is exemplary screenshots of a user-interface U.I. software application implemented as a mobile application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

User-interface U.I. software applications (U.I.) like web-browsers, virtual reality, or in-vehicle infotainment are increasing in popularity due to the ability of users to collaboratively interact and share information. For instance, social media apps like Instagram™ and Facebook™ provide users with the ability to collaboratively share photos and videos of themselves on vacation. Furthermore, Virtual Reality (VR) applications have become more popular as an engagement platform. It is contemplated the ability to have an immersive experience inside a VR device (e.g., headset) may also serve as an extension of this trip planning platform. When used within a VR setting, the present disclosure may provide a 365 degree fully immersive experience for the features described within. Also, In-vehicle solutions like head units within a vehicle seat or in-vehicle infotainment solutions are another emerging platform for use of the disclosed features. Such in-vehicle solutions may be operable to provide people traveling the ability to plan a trip and/or discover new destinations while traveling within the vehicle. Lastly, traditional website may also incorporate the features described to view and plan trips. Users could likewise use a web-browser to plan a trip, or search for destinations and areas of interest. But there exists a need for a robust U.I. that may be operable to review and share digital photos/videos (i.e., digital media) during a route or trip planning process.

For instance, a user may be in the process of setting up a cross-country (or cross-state) camping trip. The user may be trying to plan a trip from Detroit, Mich. to Chicago, Ill. While GPS utilities (e.g., Google Maps) may provide route details between these two points, such utilities do not provide the user the ability to fully review, select, and plan the entire trip. As such, it may be desirable to have a U.I. for camping, vacation, and/or trip planning processes.

Figure 1:
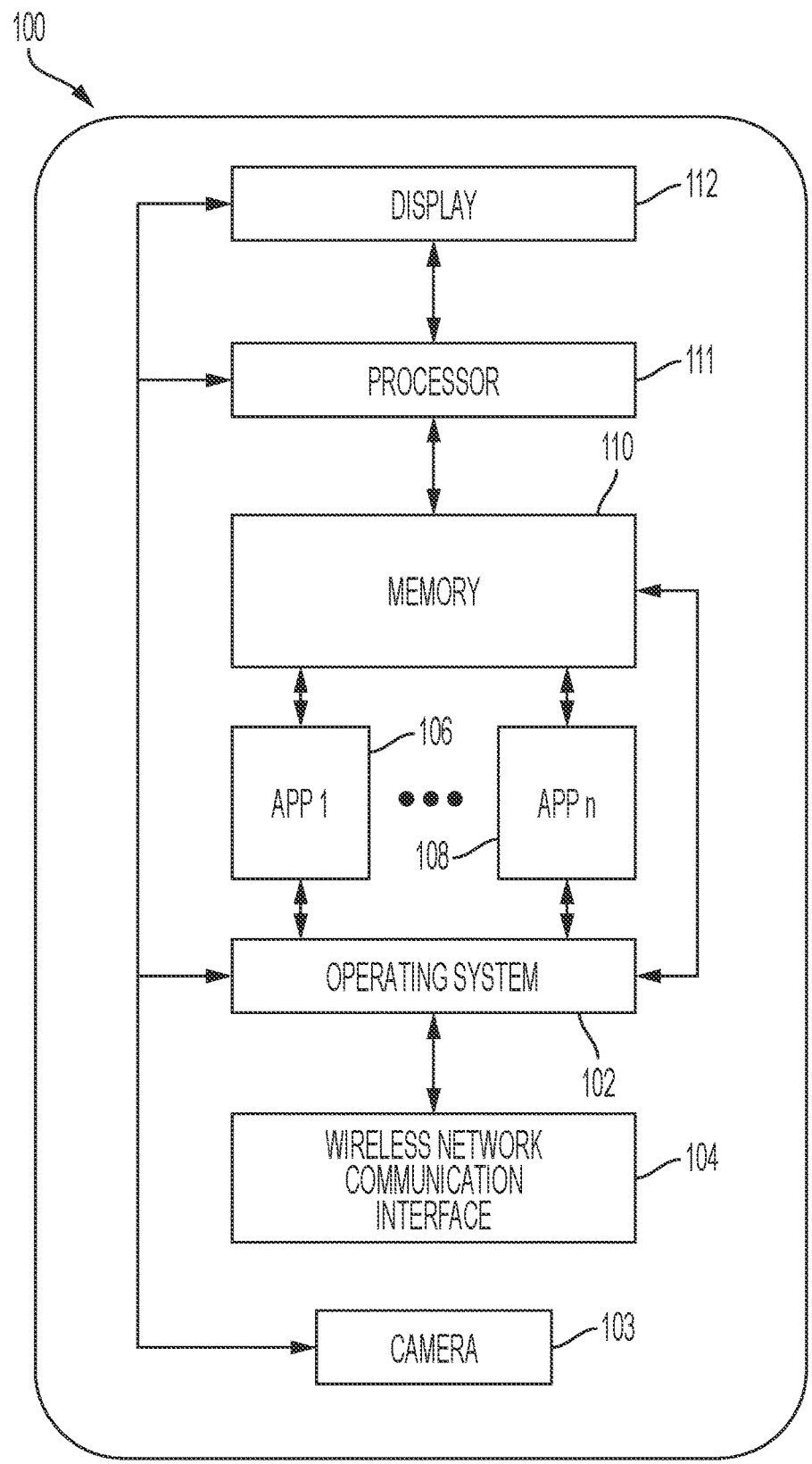
FIG. 1 is an exemplary illustration of a mobile device that may be operable to execute one or more user-interface U.I. software applications.

FIG. 1 is a block diagram illustrating an example embodiment of a device 100 that may be a smart phone, tablet, watch, virtual reality, infotainment, or other similar computing devices. Device 100 may also be a human-machine interface (HMI) within an automotive vehicle or personal computer. As illustrated, device 100 may include an operating system 102 (e.g., iOS, Android, Windows, or Linux) running on a processor 111 that is operatively connected to a memory unit 110. For instance, the processor 111 may be a microcontroller board (e.g., Arduino microcontroller or ESP8266 NodeMCU) that is programmable using an open-source firmware, or a commercially available CPU that implements an instruction such as one of the x86, ARM, Power, or MIPS instruction set families.

Memory unit 110 may include volatile memory and non-volatile memory for storing instructions and data. The non-volatile memory may include solid-state memories, such as NAND flash memory, magnetic and optical storage media, or any other suitable data storage device that retains data when the device 100 is deactivated or loses electrical power. The volatile memory may include static and dynamic random-access memory (RAM) that stores program instructions and data.

Network connectivity may be provided via a wireless network communication interface 104, which is configured to transmit and receive information via a wireless radiotelephone subsystem that includes an antenna, transceiver, and associated components to provide wireless communication connectivity via a network to other mobile devices and to networked computers, such as computer servers, via the Internet and/or other networks. For example, the network communication interface 104 may include a wireless Ethernet interface as defined by Institute of Electrical and Electronics Engineers (IEEE) 802.11 family of standards. The network communication interface 104 may also include a cellular communication interface for communicating with a cellular network (e.g., 3G, 4G, 5G). The network communication interface 104 may be further configured to provide a communication interface to an external network or cloud computing devices (i.e., servers).

A set of U.I. software apps 106 and 108 may be stored within memory 110 and may be configured to run on top of operating system 102. However, it is contemplated U.I. software apps 106-108 may be designed as a different type of U.I. for use within various types of devices. U.I. may, for example, be a web site that is viewed within a web browser, a virtual reality application, or an in-vehicle application for use within a vehicle infotainment or headrest display. U.I. software apps 106-108 may invoke one or more services of operating system 102 to communicate via wireless network communication interface 104 with remote resources, such as application servers running applications and/or services with which the U.I. software app is associated.

Operating system 102 and U.I. software apps 106-108 may also access and use memory 110 to store and retrieve data. For example, operating system 102 may allocate to each app a region of memory 110 to be used by that app to store app-related data. Similarly, each app 106-108 may be allocated a set of logical locations in a persistent storage managed by operating system 102 (e.g., an app-specific directory in a file system used by operating system 102 to manage persistently stored objects).

Operating system 102 may also be connected to and manage interactions between U.I. software apps 106-108 and a display 112. Display 112 may be designed using a touch-sensitive display device, a capacitive display device, or other displays operable to generate and provide to mobile operation system 102 user operations (e.g., touch gestures such as swiping, pinching in or out, dragging, or dropping).

A camera 103 may also be included for taking and sharing digital media (i.e., digital photos or video). The camera 103 may be accessed by U.I. software apps 106-108 to take and store digital media within memory 110. U.I. software apps 106-108 may also be operable to share digital media with an external server using wireless network communication interface 104.

It is contemplated that U.I. software apps 106-108 may also be downloaded to device 100 using known app stores (e.g., Google Play Store™, Oculus Store™) and stored within memory 110. Upon selecting and opening app 106, a user may be prompted to set up and register a user account. The user account may require the user to establish a user-name, password, and geo-graphic location details (e.g., city, state, street address, zip code, geo tags). The user account information may be stored locally within the memory 110 and/or the user account information may be transferred to an external device using the network communication interface 104. For instance, the user account information may be transferred to a server that securely stores user account information for all users who set up and register a user account.

The U.I. software apps 106-108 may also be interconnected to the world-wide web or the Internet using a standard communication protocol between one or more external computing devices. The external network may also allow information and data to be easily exchanged between computing devices and the network communication interface 104. For instance, the external devices may comprise one or more servers that are in communication with processor 111 via the external network. Or external devices may include mobile computing devices (e.g., smart phone, smart watch, tablet, or laptop) that are in communication with processor 111 via the external network.

Figure 2:
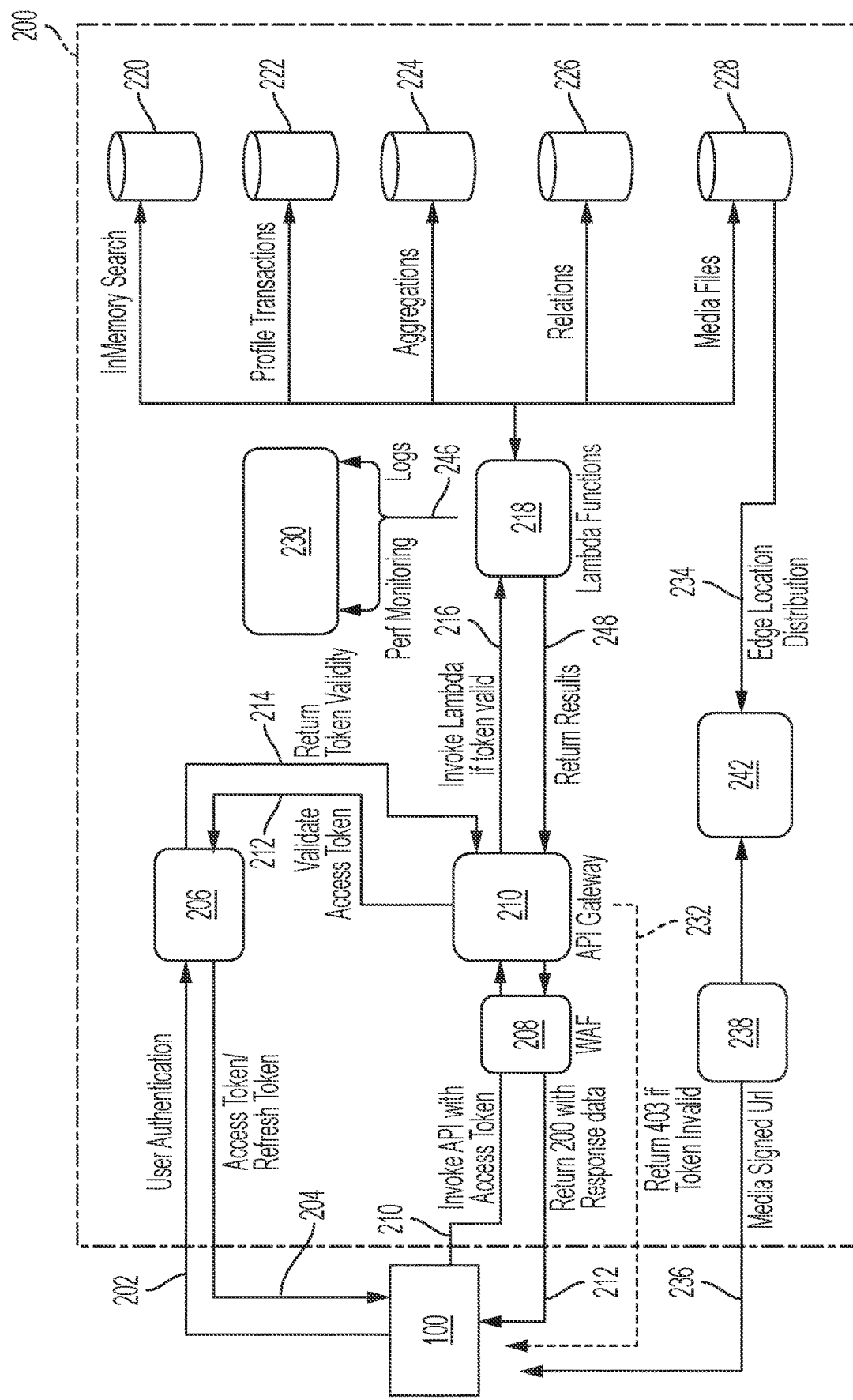
FIG. 2 is an exemplary illustration of communication and data transfer between server and the engagement platform.

FIG. 2 illustrates an external server 200 for communicating with system 100 using the external network (e.g., WiFi or cellular connection). Again, device 102 may be operable to communicate on external network using network communication interface 104. External server 200 may be a cloud computing server that communicates with device 102 for establishing and saving a user account or for transferring data and information between mobile device 100 and server 200. External server 200 may be designed as an engagement global gateway (EGG) that is a platform-as-a-service allowing the rapid development of video and digital image based apps (i.e., U.I. software app 106) or websites that may be accessed using a web-browser on mobile device 100. The EGG may also be operable to integrate with known external server platforms (e.g., Amazon Web Services™ or "AWS") which are operable to deliver high-quality digital media content to a user of U.I. software app 106. The EGG may also be designed to provide unlimited scalability and reliability.

Once U.I. software app 106 has been downloaded to device 100 a user may communicate with external server 200 (illustrated by communication pathways 202 and 204). For instance, pathway 202 may be used by U.I. software app 106 to establish and authenticate a user account. U.I. software app 106 may transmit the user account information across network connection 202 which is then received by a user management application 206. The user management application 206 may be operable to provide authentication, authorization, and user management for U.I. software app 106 (or for accessing user account using a web-browser on mobile device 100). U.I. software app 106 may permit a user initialization and sign-in capability by using username and password. Or, user management application 206 may be operable to allow a user of U.I. software app 106 the ability to access their user account through one or more third party application accounts (e.g., Facebook, Amazon, Google or Apple accounts).

If user management application 206 validates (i.e., authenticates) the user account for U.I. software app 106, an access token or security key may be transmitted from external server 200 to mobile device 100 (as shown by pathway 204). The access token/security key may permit additional communication between mobile device 100 and external server 200. It is also contemplated that user management application 206 may be operable to provide refresh tokens between mobile device 100 and external server 200. The refresh tokens may be used to continually authenticate U.I. software app 106 during an active session.

Once a user account has been established and authenticated, U.I. software app 106 may invoke an API session and provide the access token (or refresh token) to a web application firewall (WAF) 208. It is contemplated the WAF 208 may be operable to provide security for web applications or application programming interface (API) against common web exploits (e.g., malware) that may compromise security. The WAF 208 may provide the token to an API Gateway 210 that communicates with the user management application 206 (as shown by communication pathway 212) to validate the access token provided by mobile device 100. The user management application 206 may provide a return message (as shown by communication pathway 214) to the API Gateway 210 indicating the user token has been validated.

If the token is authenticated as being valid by the user management application 206 (pathway 214), the API gateway 210 may invoke one or more computing service 218 (pathway 216). It is contemplated the API gateway 210 and the computing service 218 may be operable to transmit and deliver data to front-end applications like U.I. software app 106. Data may be retrieved by computing service 218 from one or more services that are used to store and cache data relating to the U.I. software app 106 (i.e., the user account).

For instance, an in-memory data storage and cache service 220 may operate to retrieve information from managed in-memory cache systems. A dynamic database management system 222 (DDBMS) may operate to store objects (i.e., profile transactions) having a value-based relationship, which may be specified at retrieval time. A relational Database Service 224 (RDS) may operate to aggregate, store, and provide access to data points that are related to one another. A Managed Graph Database 226 may operate to store and query relationships between datasets. Lastly, an object storage service 228 (e.g., Amazon Simple Storage Service or "S3") may operate to process and store digital media files. Lastly, the computing service 218 may communicate with monitoring and management service 230 (shown by pathway 246) which provide performance, operational, and auditing data.

Once the computing service 218 retrieves the data requested by the invocation (pathway 216), the data results are then returned to the API gateway 210 (pathway 248). In turn, the Firewall 208 will return the results and data back to device 100 (pathway 212). It is also contemplated that if the device provides an invalid token to firewall 208 (pathway 210) the API gateway will be notified by user management application 206 (pathway 214) and the API Gateway 210 will send an invalid token response back to device 100 (pathway 232) denying the data requested. In other words, the API gateway 210 will not invoke the computing service 218 when an invalid token is provided by U.I. software app 106 from device 100.

It is also contemplated the object storage service 228 may be connected to a content delivery network (CDN) 242 (pathway 234). The CDN 242 may be operable to more quickly transmit and provide requested data (e.g., digital media) when requested by U.I. software app 106. It is contemplated the CDN 242 may transmit the requested data using a second web application firewall 238 (pathway 240), or alternatively using WAF 208. As illustrated, WAF 238 may then operate to allow the data to be transmitted to device 100 as a media signed URL (pathway 236).

It is also contemplated an artificial intelligence (A.I.). algorithm may be operable to assist in selecting one or more digital media to provide to a user during the trip planning process. For instance, the A.I. algorithm may be a classification algorithm that may divide a subjected variable into different classes and then predict the class for a given output. Such a classification algorithm may be performed using a naïve bayes, decision tree, random forest, or k-nearest neighbor algorithm. Or, it is contemplated the A.I. algorithm may be implemented using a regression algorithm (e.g., linear, lasso, logistic, or multivariate) or a clustering algorithm (e.g., k-means, fuzzy c-means, or hierarchical clustering). The A.I. algorithm may be designed as part of U.I. software app 106 or may reside on server 200 and may be implemented during validated communications with device 100.

With regards to trip planning, the A.I. algorithm may operate to determine and select digital media to provide to a given user based on interest tags associated with a given user account (i.e., profile). For instance, while using U.I. software app 106, a user may provide input search requests relating to a given outdoor activity (e.g., rock climbing or fishing). The A.I. algorithm may recognize and generate an interest tag based on the user searches for the activities. The A.I. algorithm may select and provide digital media related to the interest tag during future operation of U.I. software app 106. The A.I. engine may also provide the user with one or more digital media options to be played and may also select and preload a new digital media to be played once the current media file has been viewed.

The A.I. engine may also be operable to refine digital media provided to a user based on previously searched digital media, previously viewed digital media, or digital media which a user may have uniquely identified using a tag indicator. For instance, a user searching rock climbing may begin to find digital media stored on server 200 which were provided by other users. The digital media may have been uploaded to server 200 by users that also have registered accounts (i.e., user accounts). Or, non-registered users may have provided digital media using a guest account.

U.I. software app 106 may allow a given user the ability to provide a "like" or "favorite" tag or indicator to stored digital media. The tag/indicator may then be stored within U.I. software app 106 or may be transmitted and stored as part of the user account on server 200. The A.I. engine may use the tag/indicator to refine and select digital media that show additional rock-climbing digital media stored on server 200. The A.I. engine may also apply one or more exclusion algorithms to exclude digital media that a user's history indicates are not of interest or based upon user pre-selection to not include such videos. For instance, the user may have provided an interest in rock climbing and mountain biking but has never provided a tag/indicator or shown an interest in hunting. In this example, the A.I. engine may begin to exclude any digital media related to hunting activities until the user interests are modified.

Also, the exclusion algorithm may be modified using one or more exclusion tags (e.g., a dislike or unfavorite tag). For instance, a given user may find certain activities offensive (e.g., hunting and fishing). The user may provide these exclusion tags to their user account, or the user may apply exclusion tags when digital media of disliked activities are provided. The A.I. algorithm may also evaluate and tag digital media as explicit or prohibited content. For instance, the A.I. algorithm may tag and reject digital media that includes explicit content (e.g., violence, nudity, or drugs). In other words, the A.I. algorithm may prohibit explicit content from being stored by U.I. software app 106 or uploaded from U.I. software app 106 to server 200.

U.I. software app 106 may also allow users the ability to follow other users. Followed user may improve the frequency in which a post from one given user is sent and observed by other users. U.I. software app 106 may also be operable to remove users or to allow two users to message each other from within the platform. It is also contemplated if a user applies a tag (e.g., using U.I. software app 106 to favorite another user having an account stored on server 200), the applied tag may also be visible on other platform. For example, if a first user that has loaded the U.I. software app 106 on their mobile phone searches and discovers a second user that has uploaded videos relating to rock climbing, the first user can tag the second user as a "favorite." If the first user has the U.I. software app 106 loaded on an in-vehicle infotainment system, the "favorite" tag would be used to display the rock climbing videos from the second user on the in-vehicle infotainment system. In other words, the A.I. algorithm would process and apply tags across various devices or platforms for any given user.

Figure 3:
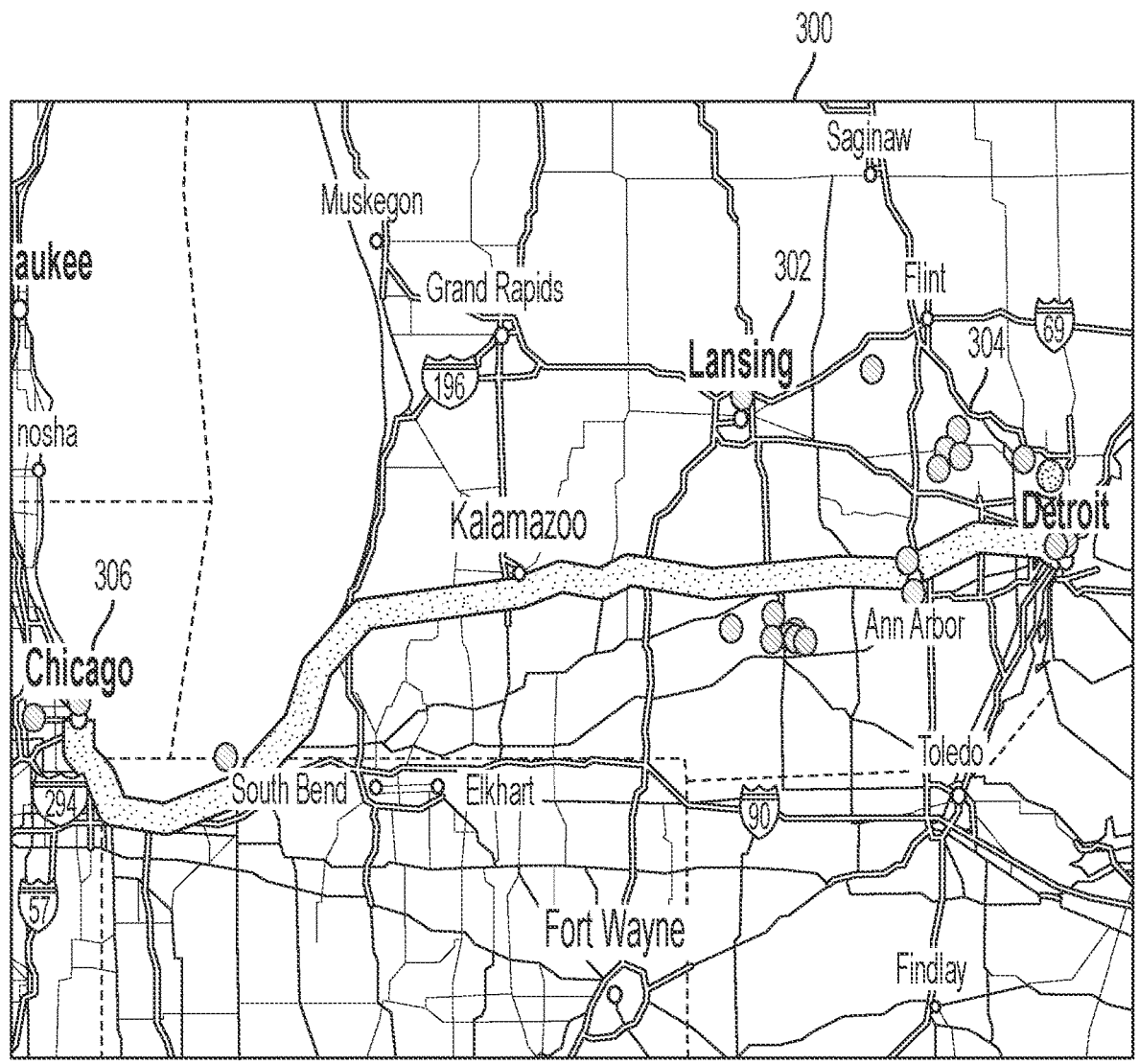
FIG. 3 is an exemplary screen of the trip engagement platform operating on mobile device.

The A.I. engine may further be operable to refine digital media content displayed on U.I. software app 106 based on the current geo-graphic location of device 100. For instance, FIG. 3 illustrates a selected trip route 300 on U.I. software app 106 for a given trip between Detroit, Mich. and Chicago, Ill. The route 300 may include indicator pins 302, 304, 306 that the A.I. algorithm may have indicated as including locations or activities that would be of interest to the user. The user may select any one of the indicator pins (e.g., indicator pin 302) and digital media may be displayed to the user. Additional or new indicator pins may be generated based on the current geo-graphic location of device 100 while a user is travelling between Detroit and Chicago. A user may also zoom in along a particular location along the trip route 300 and U.I. software app 106 may be updated with additional indicator pins showing more locations or areas of interest. The A.I. algorithm may also be operable to categorize and list travel locations starting with the closest location as entered by the user. For instance, a user planning a camping trip between Detroit, Mich. and Seattle, Wash. may enter one or more locations along the route they wish to stop and rest near each night. If the user enters Chicago, Ill. as one of the travel locations, the A.I. algorithm may collect and list campgrounds near or around Chicago for the user to review. The listed campgrounds may include digital media for the user to review to assist in the selection process. The digital media may be provided by other users that have stayed at the campground, or the digital media may be provided by the owner/operator of the campground. Further, the digital media may show sites within the campground available for rental. The user may then select and reserve the campground site using U.I. software app 106. The travel locations are not limited to campgrounds and the user may alternatively search and reserve other lodging accommodations like hotel/motel rooms, bed-and-breakfast locations, rental homes. Once a given set of travel locations along the travel route are selected, the A.I. algorithm may update indicator pins to provide locations or activities near the selected lodging selected for the user to review.

It is contemplated the EGG may also be operable to track searches in a given U.I. software app for users returning or using a separate U.I. software app (e.g., a website, virtual reality, or infotainment solution). The application home page will display the previously searched user interest tags in the application home page. This may provide a custom look and feel to the application and help fill the trip planning needs better for our users.

U.I. software app 106 may also provide intuitive U.I. functionality allowing the user to quickly review and remove unwanted locations. For instance, the lodging locations listed on U.I. software app 106 may be shown using digital media and information about a given campground. The user may be able to use touch gestures on display 112 indicating a "like" or "dislike" for the displayed location. For instance, a user may swipe right on display 112 for "liked" locations and swipe left on display 112 for "disliked" locations. The A.I. algorithm may store the user's "like" and "dislike" selections within the user account and may use the stored selections to provide new or updated locations and digital media for the user to review. The digital media can then be used to assist in the final route selection based on the selection of lodging and areas of interest selected by A.I. algorithm.

The U.I. functionality may also allow the user to swipe up and U.I. software app 106 may display or play digital media about a given location or area of interest. Again, the digital media for a lodging location or area of interest may be based on digital media uploaded to server 200 and based on the user's interest tags. Lastly, the U.I. functionality may allow the user to swipe down on display 112 and U.I. software app 106 will illustrate a map with the geo-graphic information for the lodging location or area of interest selected.

The A.I. algorithm may also be operable to evaluate and link videos being uploaded from U.I. software app 106. For instance, a user may upload digital media regarding a given campsite while staying at a campground. The A.I. algorithm may link the digital media to the campground location and to surrounding areas of interest (e.g., lakes, hiking trails). The uploaded and linked digital media may then be provided to other users accessing server 200 with a stored user account or using a guest account.

The A.I. algorithm may also combine digital media in forming a trip route and to assist in navigation along the trip route. Again, the A.I. algorithm may assist in finding suitable lodging locations (e.g., campgrounds) or areas of interest based on an inputted trip route. The U.I. software app 106 may then provide the suggested lodging locations and areas of interest to the user for selection within a trip route. Once a trip route (including lodging and routes of interest) is selected, the U.I. software app 106 may plot directions on third-party mapping software to provide turn-by-turn directions.

The A.I. algorithm may also store a given user's trip route on server 200. The A.I. algorithm may provide one or more stored trip routes to any user with a stored user account or when accessing a guest account. For instance, if a user selects a trip route between Detroit, Mich. and Seattle, Wash., the A.I. algorithm may query stored trip routes on server 200 selected by other users that have previously travelled a similar route as the one requested. The user may select (i.e., copy) lodging locations or areas of interest provided by the stored trip routes. The user may also modify portions of the stored trip route to include additional or different lodging locations or areas of interest. The modified trip route may subsequently also be stored on server 200 and would be available for query during future searches. By using previously stored trip routes, route planning may be more efficient performed and a user may be provided lodging and areas of interest that may not otherwise have been discovered independently.

The U.I. software app 106 may also be operable to integrate with third-party tools (e.g., Google Sheets and Discord) to assist in the route planning. Such third-party tools may allow users that are not members of the U.I. software app to collaborate and assist in route planning. The U.I. software app 106 may also be operatively integrated with third-party applications for trip planning and mapping. The given destination may also be downloaded to other apps such as Google Maps and Apple Maps.

The U.I. software app 106 may further be operable to provide an option for allowing a user to save videos with geo-location tags. The geo location-tags may be used to show a travel video's location on a map for easy trip planning.

Figure 4A:
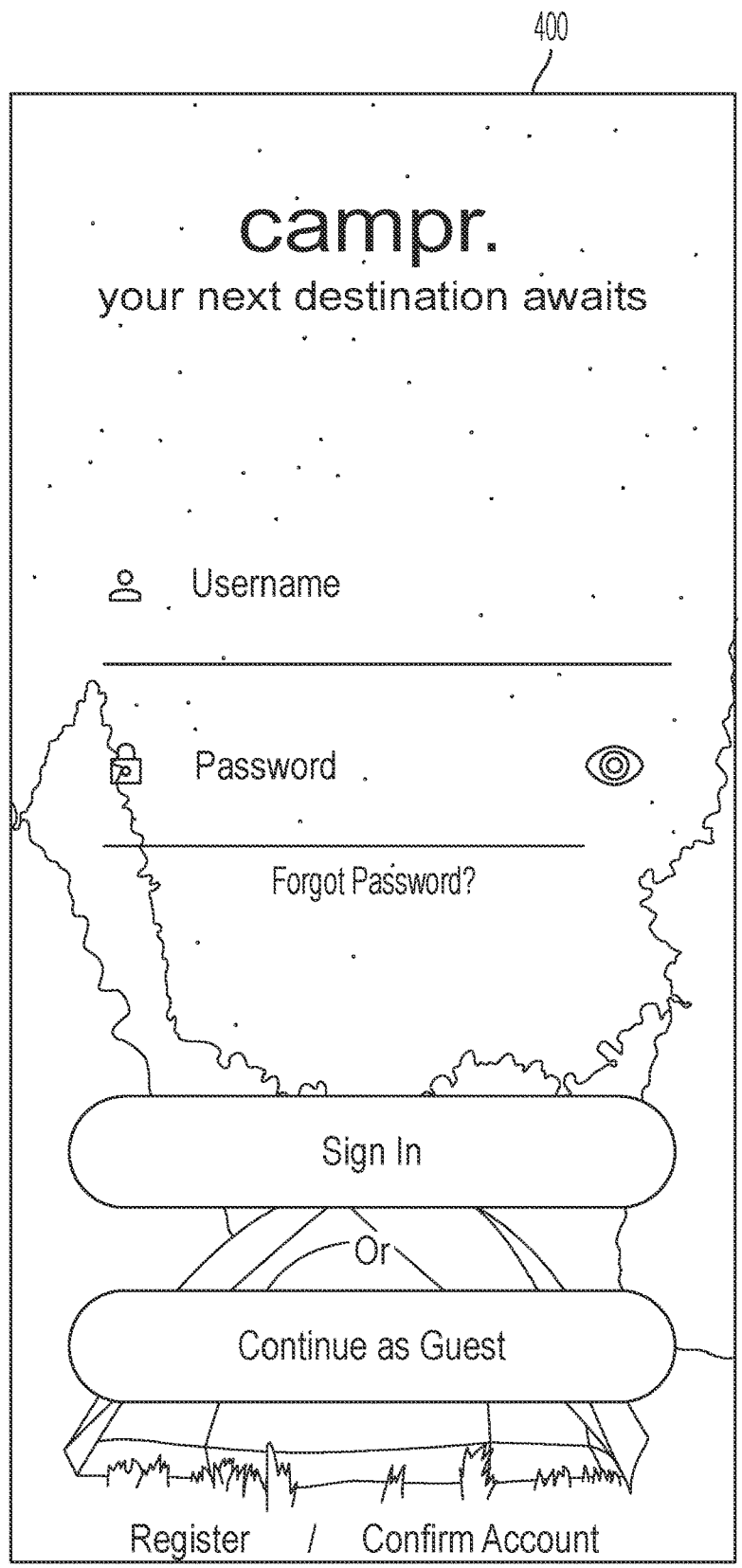
FIGS. 4A-4B are additional exemplary screenshots of the user-interface U.I. software application implemented as the mobile application.

It is contemplated that U.I. software app 106 may have one or more "pages" or screens to assist a user with the route planning and review process. FIG. 4A illustrates a login page 400 that a user may be presented when selecting to open the U.I. software app 106 on device (e.g., loading mobile app on smartphone). As illustrated, the user may input their username and password which may be stored as part of the user account information on server 200. Alternatively, the user may choose to click the "continue as guest" link on the login page 400 where the user will be logged in to the U.I. software app 106 under a pre-defined guest account. The guest account information may be stored on server 200 with data applicable to a given geographic location. The guest account information may further be used to determine locations or areas of interest generated and displayed to the user.

Figure 4B:
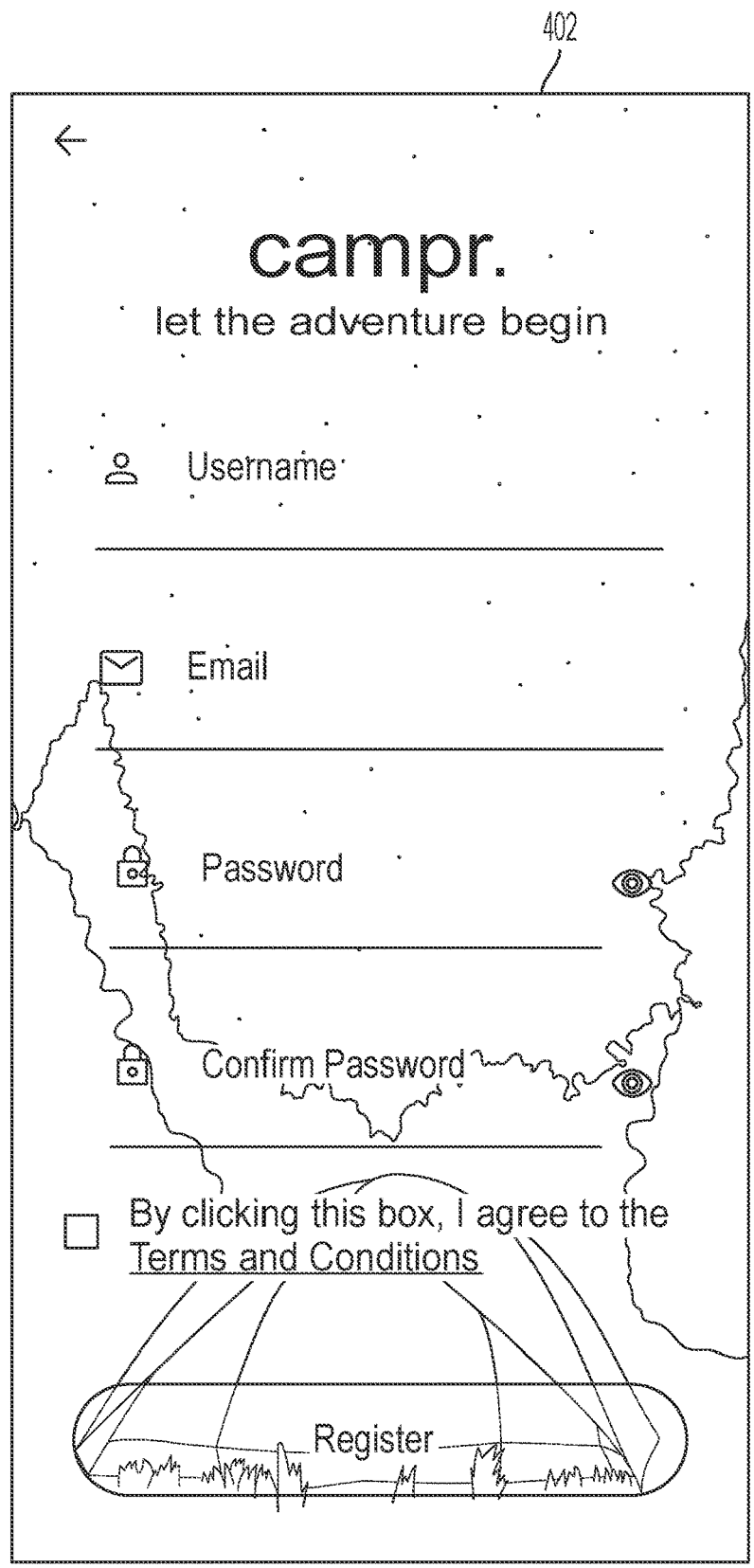

As shown by FIG. 4B, a user may be taken to a registration page 402 by clicking on the register link illustrated on FIG. 4A. The user registration page may be used to collect account information such as a username, email, and password. However, it is also contemplated the registration page may collect account information that includes a user's geographic location, gender type, areas of interest, or travel preferences.

Figure 5A:
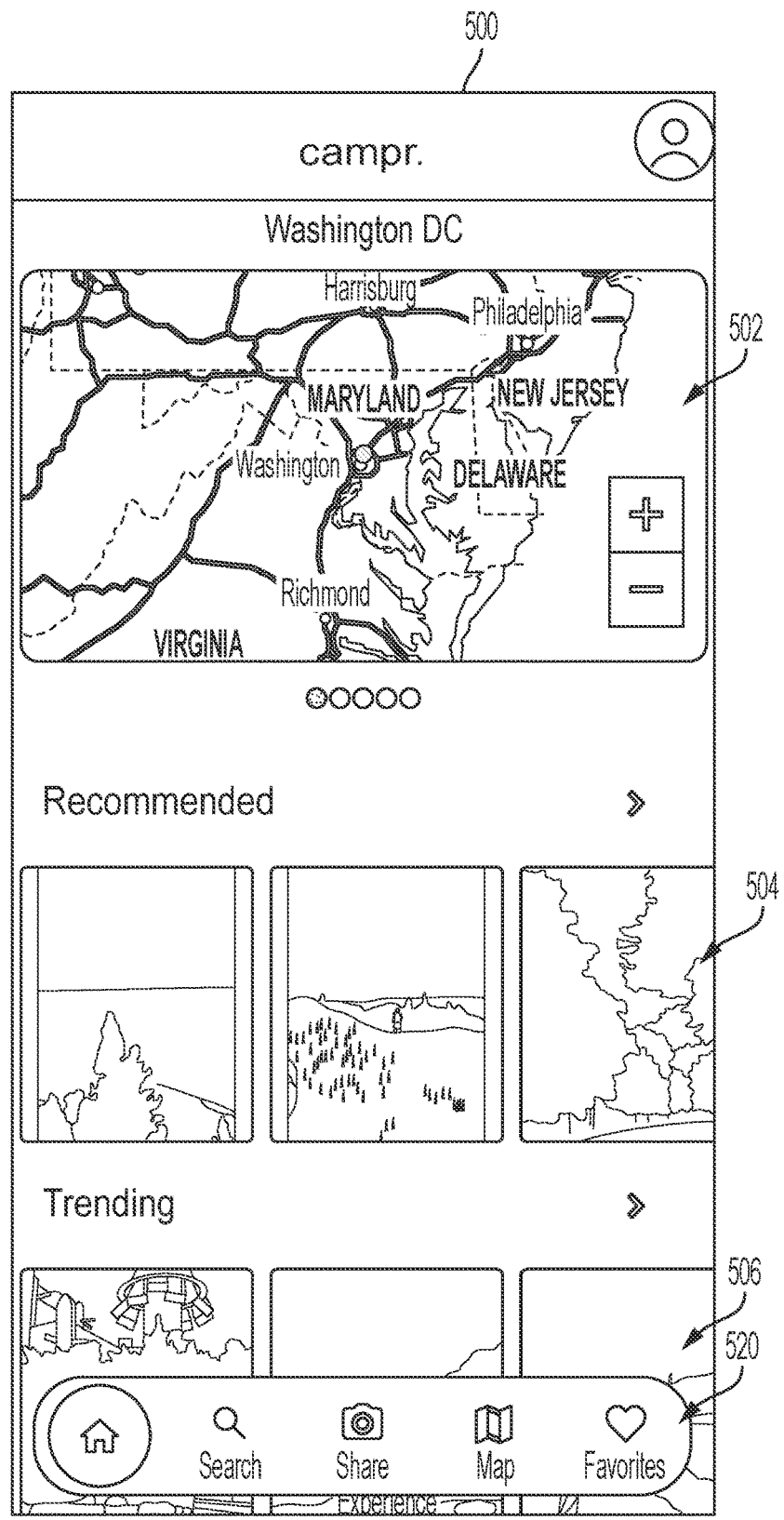
FIGS. 5A-5C are additional exemplary screenshots of the user-interface U.I. software application implemented as the mobile application.
Figure 5B:
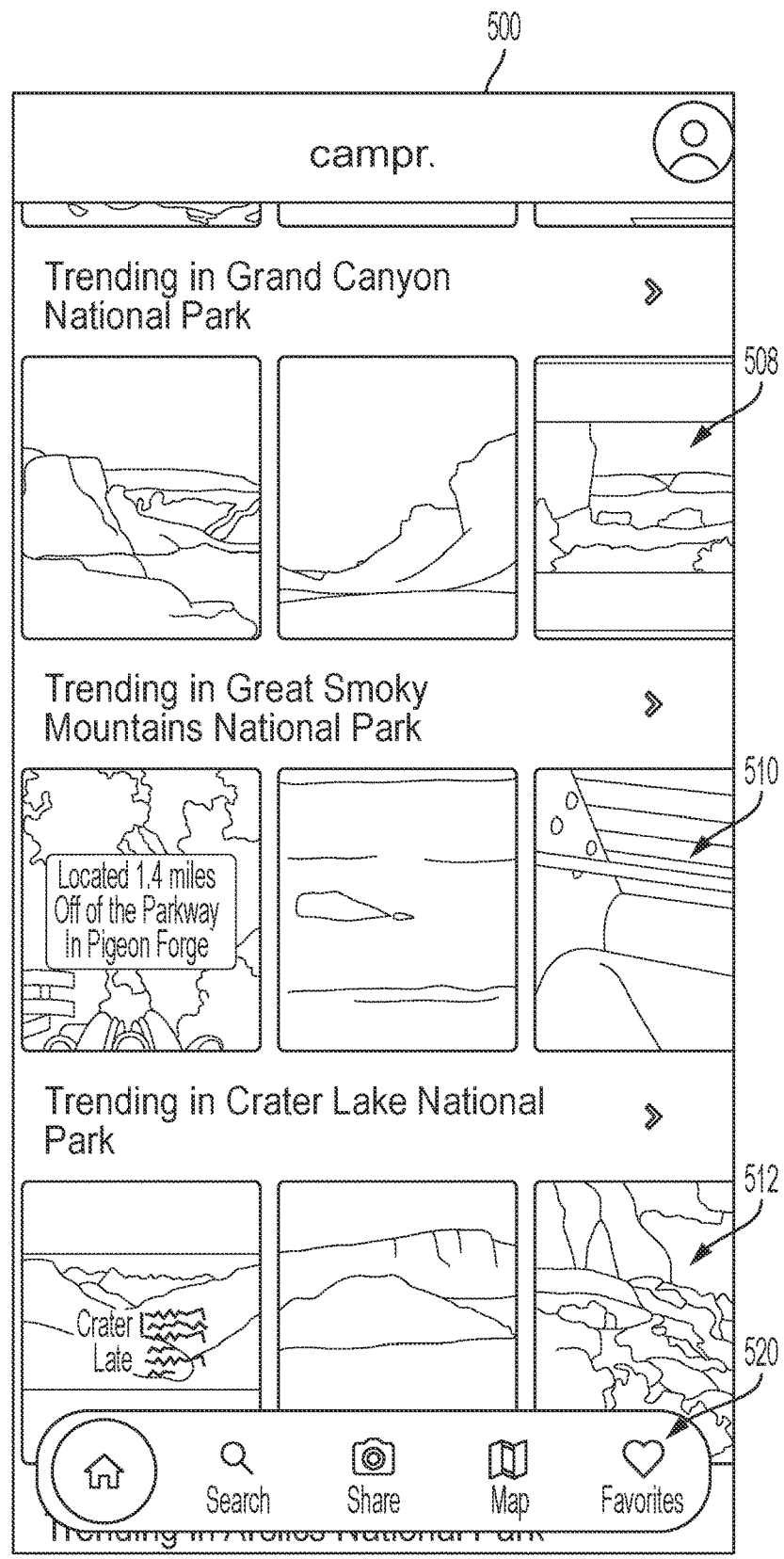
Figure 5C:
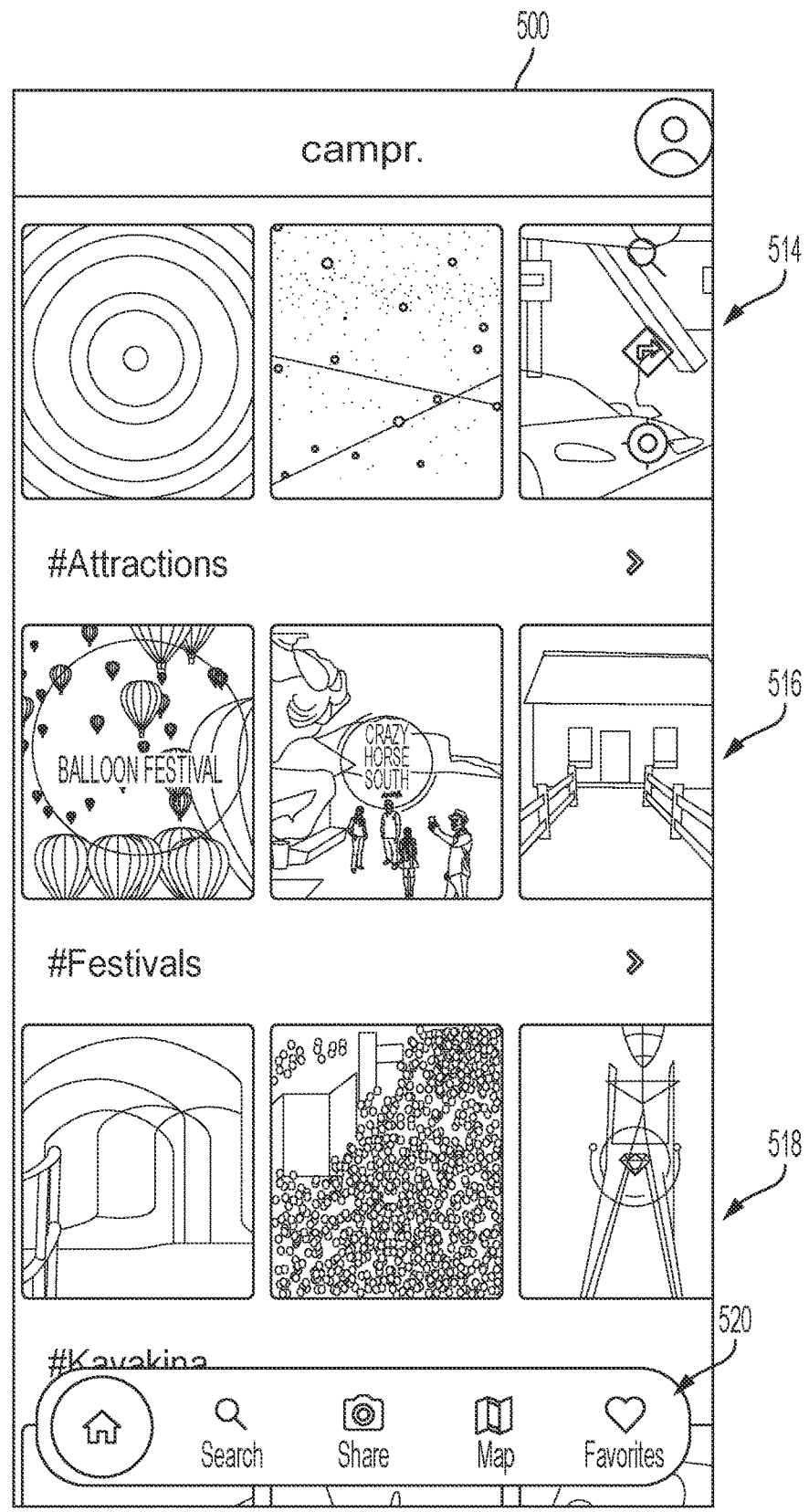

FIGS. 5A, 5B, and 5C illustrate an exemplary home or "landing" page 500 that may be provided and appear each time user first initializes and logs into the U.I. software app 106. It is contemplated the home page 500 may be one continuous scrolling page accessible and viewable using hand gestures (e.g., finger swipe on display 112). Or a user may return to the home page 500 when located on a different page when operating U.I. software app 106. The home page 500 may provide functionality allowing a user to review digital media and information relating to lodging locations or areas of interest. The home page 500 may provide a user with digital media and information relating to campgrounds, camping equipment, travel deals, maps, and previously stored reviews provided by other users.

For instance, FIGS. 5A-5C illustrate a geographic location 502, "recommended" location/area-of-interest locations 504, "trending" locations 506-512, or tagged (e.g., using hashtag) locations 514-518 that A.I. algorithm may display to a user with digital media according to a given user account, prior searches, tags indicators, or the like The geographic location 502 may include numerous locations that the user may swipe between. The recommended locations 504, trending locations 506-512, and tagged locations 514-518 may be adjusted by the A.I. algorithm based on the geographic location 502 being viewed by user, the user account information, or other factors described. The home page 500 may also include soft-buttons 520 that may allow the user the capability of searching for lodging locations (e.g., campgrounds) or area-of-interests. The soft-buttons may also allow a user to take video/pictures which can be uploaded to server 200, to view a given location on a mapping software, or to provide an indicator (i.e., "like" indicator) to a given location or area-of-interest.

Figure 6A:
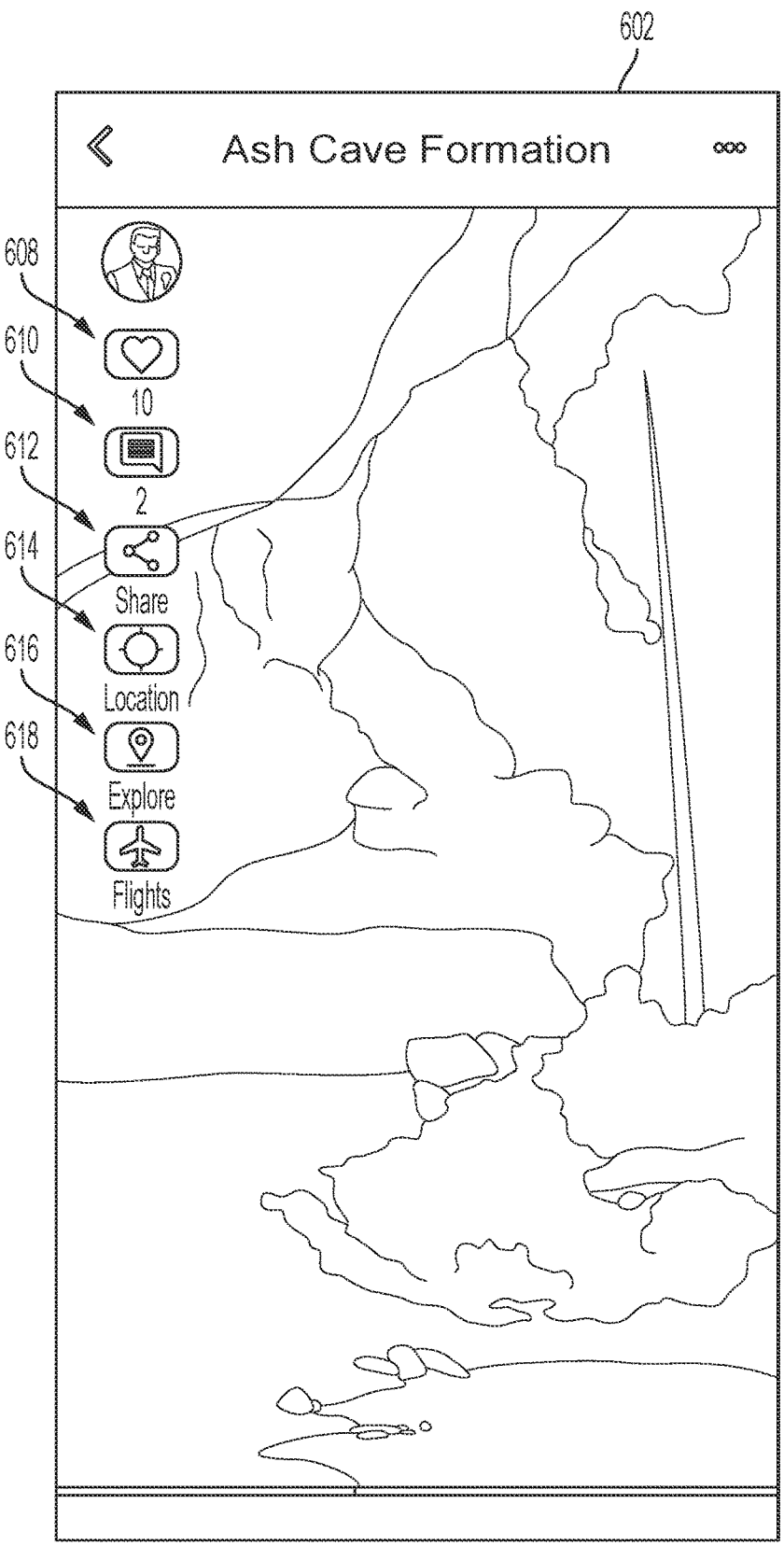
FIGS. 6A-6C are additional exemplary screenshots of the user-interface U.I. software application implemented as the mobile application.
Figure 6B:
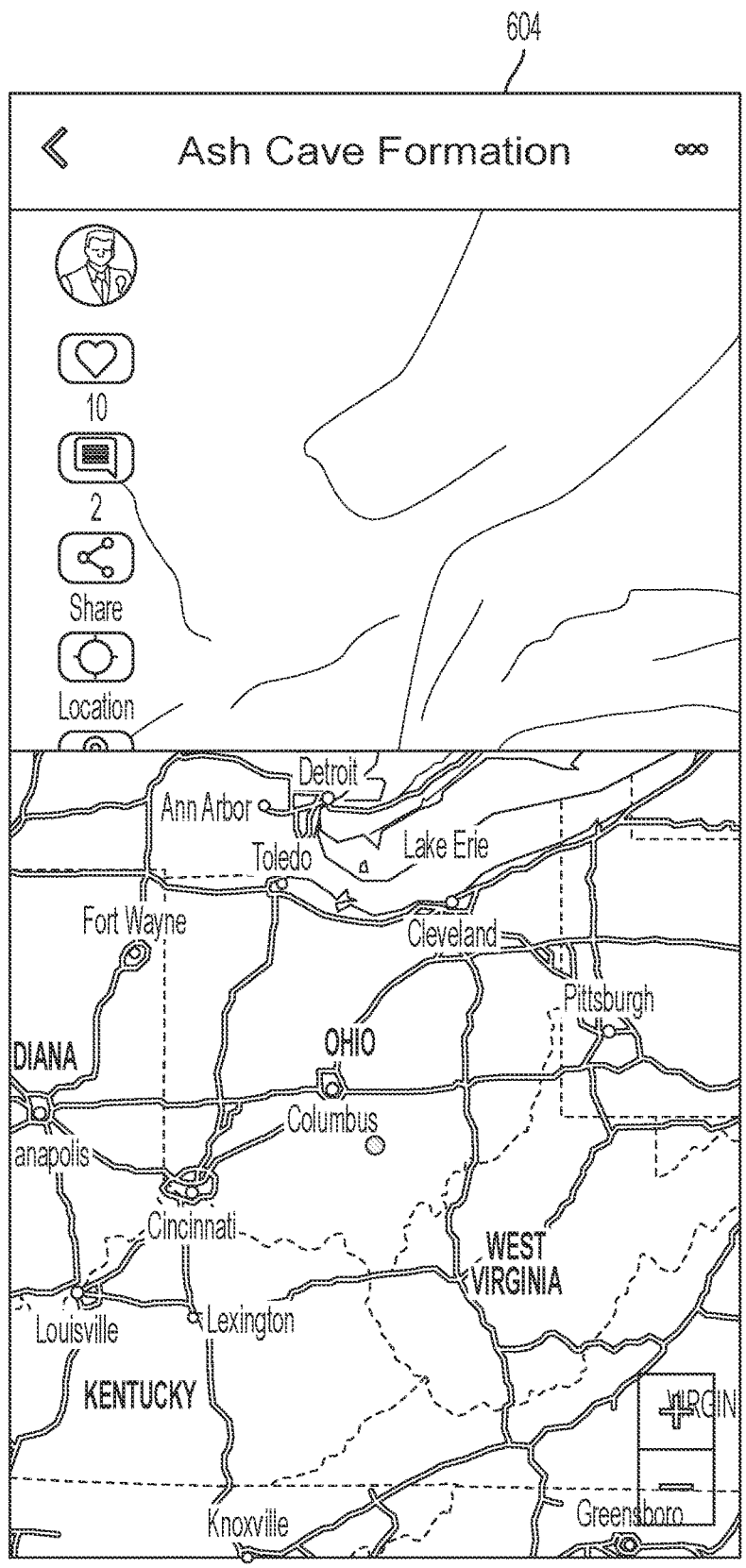
Figure 6C:

As illustrated by FIGS. 6A-6C, the U.I. software app 106 may also include a digital media page for searching and viewing digital media about lodging locations or areas of interest. As discussed above, a user may use U.I. gestures (e.g., swipe right or left) to provide feedback to the A.I. algorithm about the digital media being presented. Such U.I. gestures may be used by A.I. algorithm to modify and refine the digital media being displayed to the user about lodging locations (e.g., campgrounds) or areas of interest (e.g., rock climbing locations). The digital media page may include the tag indicators that are provided and used to A.I. algorithm for indicating "liked" or "disliked" digital media. Again, the tag indicators may be used by A.I. algorithm to further refine the digital media provided. For instance, FIG. 6A illustrates a "like" icon 608 that may be used as a tag indicator by A.I. algorithm.

The digital media page may include functionality (e.g., share icon 612) for sharing digital media, locations, or areas of interest with other users. For instance, a user may share a campground location provided on U.I. software app 106.

The shared campground location may be transmitted to another user having a registered account stored on server 200 or to a user not having a registered account via a weblink. The shared campground location may include digital media and information that can be used within U.I. software app loaded on a separate device or within a web browser.

The digital media page 602 may also provide functionality for adding comments (e.g., comment icon 610) regarding a particular digital media being displayed. These comments may be stored on server 200 as part of user account and may be used by A.I. algorithm to further refine additional digital media being displayed. Or comments added by other users may be used by A.I. algorithm to refine the digital media being displayed to user of U.I. software app 106. The digital media page may also be used to report additional information about the displayed digital media (e.g., bad location, inappropriate content, or copywrite issue). Users can also rate posting in terms of how much the liked or disliked a post. The A.I. algorithm may discover additional posted information from users about the digital media being viewed. Lastly, the A.I. algorithm may search and provide posted information for other locations like the digital media being displayed. For instance, a user may be reviewing digital media regarding a campground near Chicago, Ill. The A.I. algorithm may be operable to locate campgrounds owned by the same corporate entity, campgrounds similarly sized, or campgrounds offering similar amenities. The A.I. algorithm may then provide this posted information along with the digital media to assist the user in the route planning process.

The digital media page 602 may also include a mapping feature (e.g., icon 614) which will provide a geo-graphic location of the selected digital media page 602 (as illustrated by page 604). Or the mapping feature may provide turn-by-turn directions from the current location of the device 100 to the geo-graphic location of the digital media page 602. Also, an explore icon 616 may provide a map (as illustrated by page 606 of FIG. 6C) with additional "pinned" locations or areas-of-interest within a predefined proximity of the digital media page 602. Lastly, a flight icon 618 may be used to search for travel, plane, or other transportation options (e.g., Uber or Lyft) from the geo-graphic location of device 100 to the location being displayed on the digital media page 602.

It is also contemplated that the digital media page 602 (or other pages within U.I. software app 206) may include functionality to review travel agents or guides for the provided location. For instance, digital media page 602 may include functionality about local guides that could assist in exploring a given location. Or, suggested travel agents may be provided to assist a user in searching and finding lodging accommodations near the location of area displayed on the digital media page 602.

The U.I. software app 106 may also include a video editor page for generating, editing, storing, and uploading digital media to server 200. For instance, the video editor page may include functionality that allows a user the capability of adding titles, music, or filters to digital media. The video editor page may provide functionality to adjust the length or speed of a digital video. Or, the video editor page may provide functionality to select one or more digital photos that can be combined to generate a slideshow video. The video editor page may also be used to tag other stored digital media saved on server 200 which A.I. algorithm may in turn use when selecting future digital media to be displayed.

Figure 7A:
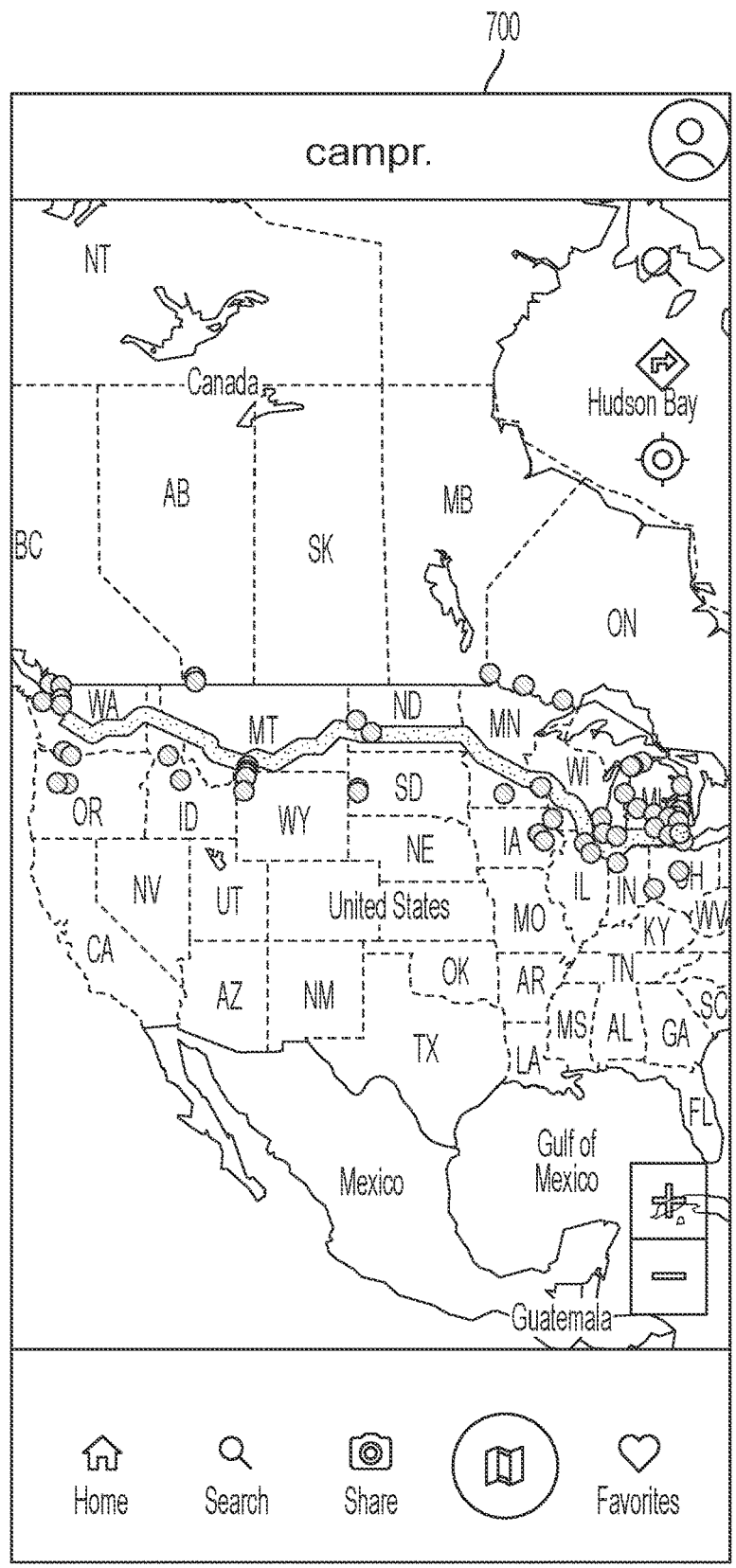
FIGS. 7A-7B are additional exemplary screenshots of the user-interface U.I. software application implemented as the mobile application.
Figure 7B:
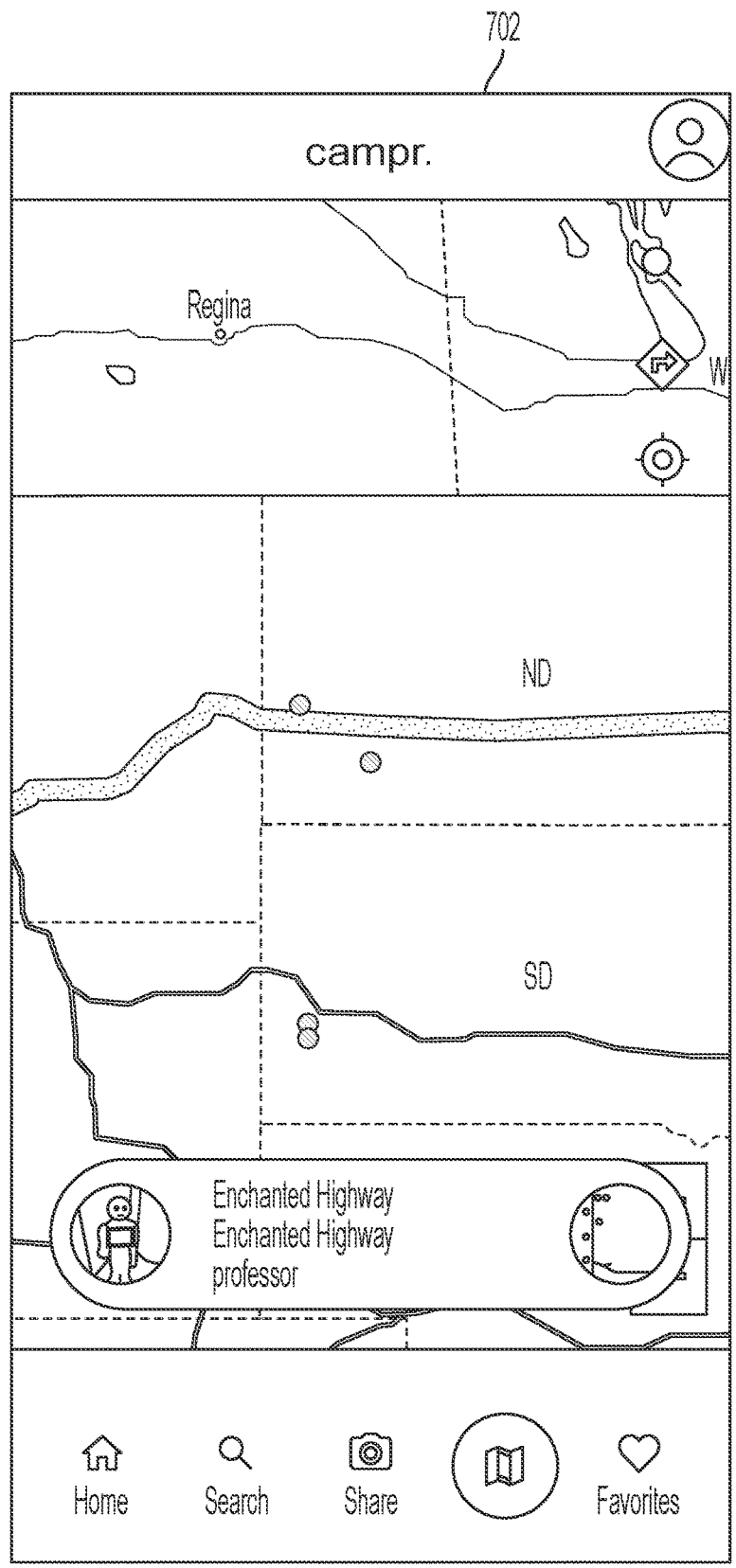

As shown by FIG. 7A, the U.I. software app 106 may include a mapping page 700 that is used to illustrate a selected travel route, travel locations, lodging locations, and areas of interest. It is contemplated that lodging locations (e.g., campgrounds) may be designated with pins of a certain color placed on a map and areas of interest may be designated differently colored pins. For instance, the mapping page 700 may designate campgrounds using blue pins and areas of interest using red pins. A user may select the red pins and be provided with digital media about the area of interest being displayed. The A.I. algorithm may operate to provide pins within a given proximity of the selected trave route (e.g., within 5 miles) or within a given proximity of a selected lodging location (e.g., within 10 miles of a campground site). As shown by mapping page 700, a series of pins may be illustrated between a selected route between Detroit, Mich. and Seattle, Wash. As illustrated by FIG. 7B, the U.I. software app 106 may allow a user the ability to zoom into a given selection of the selected travel route, where additional pins illustrating additional lodging locations or areas-of-interest. The user may then review and add these locations or areas-of-interest to the travel route. The U.I. software app 106 may also be operable to include and apply filter tags upon the mapping page.

A profile page may include user account information and information regarding posts in a grid view. Lastly, a search page may be operable to allow a user to add locations or areas of interest to a favorite list or to provide U.I. gestures indicating likes and dislikes. The A.I. algorithm may also use filters, tags, titles, users, to further search the server 200 for locations or areas of interest.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A trip planning and reservation method, comprising:
   responsive to receiving user account information on a computing device, validating the user account information and providing an access token to the computing device;
   responsive to receiving the access token, invoking an API gateway that validates the access token as being permitted to access digital media files;
   responsive to the access token being validated by the API gateway, providing a desired travel route between a first location and a second location;
   responsive to receiving the desired travel route, displaying one or more of the digital media files on the computing device, the one or more digital media files being identified by an artificial intelligence (A.I.) algorithm that considers operational data including the user account information and one or more user interest tags, wherein each of the one or more digital media files includes geo-graphic coordinates and data about a location within a pre-defined proximity of the desired travel route;
   receiving a selection of the one or more digital media files displayed to form a selected set of travel locations along the travel route, the selection including lodging and responsive to the selection making a reservation at the lodging;
   updating the desired travel route to include the selected set of travel locations along the travel route; and displaying one or more additional digital media files within a pre-defined proximity of the selected set of travel locations along the travel route.

2. The method of claim 1, further comprising: generating the one or more user interest tags based on one or more searches initiated on the computing device relating to the desired travel route and to previously provided travel routes.

3. The method of claim 1, further comprising: generating the one or more user interest tags based on one or more searches initiated on the computing device relating to a user defined activity.

4. The method of claim 1, wherein the operational data received by the A.I. algorithm further includes one or more digital media files that have previously been displayed on the computing device.

5. The method of claim 1, wherein the A.I. algorithm is further operable to exclude digital media using historical search records that were recorded by the computing device.

6. The method of claim 1, wherein the operational data received by the A.I. algorithm further includes exclusion tags for prohibiting digital media identified as being unfavorable from being displayed on the computing device.

7. The method of claim 1, wherein the operational data received by the A.I. algorithm further includes a restrictive-content criteria that prohibits explicit material from being stored by the computing device.

8. The method of claim 1, further comprising: in response to a first file being selected, re-classifying and predicting an updated plurality of digital media files to be displayed by the computing device using the A.I. algorithm.

9. The method of claim 1, further comprising:
concatenating two or more digital photos together to form a video file; and
appending the video file to include geographic coordinates, locational information, and at least a portion of the user account information.

10. The method of claim 1, further comprising: providing turn-by-turn directions between the first location and a second location, wherein a first file includes a lodging location in a first predefined proximity of the second location.

11. The method of claim 10, further comprising:
selecting a second file from the one or more digital media files for operation with the desired travel route, the second file relating to an area-of-interest that is within a second predefined proximity of the desired travel route, the second file including a set of geographic coordinates; and
providing turn-by-turn directions from the first location, the set of geographic coordinates, and the second location.

12. A method for generating a travel route, comprising:
responsive to activating a user-interface (U.I.) software app on a mobile device, validating a user account and providing an access token to the mobile device authorizing operation of the U.I. software app;
responsive to being provided the access token, receiving a desired travel route between a first location and a second location;
responsive to receiving the travel route, classifying and predicting a first set of digital media files to be displayed by the U.I. software app using an artificial intelligence (A.I.) algorithm that considers a first operational dataset that includes the user account, one or more user interest tags, and stored trip routes selected by other users wherein each of the first set of digital media files includes geo-graphic coordinates and data about a location within a pre-defined proximity of the desired travel route;
responsive to the first set of digital media files being displayed by the U.I. software app, selecting a first file from the first set of digital media files for inclusion within the travel route, the first file including a lodging location in a first predefined proximity of the second location;
responsive to the first file being selected, generating turn-by-turn directions from the first location to the lodging location; and
responsive to generating turn-by-turn directions, re-classifying and predicting a second set of digital media files to be displayed by the U.I. software app using the A.I. algorithm, wherein in addition to the user account and the one or more user interest tags the A.I. algorithm predicts the second set of digital media files based on a predefined proximity along the turn-by-turn directions.

13. The method of claim 12, wherein the turn-by-turn directions are displayed on an interactive map within the U.I. software app, and the second set of digital media files are displayed.

14. The method of claim 12, further comprising: generating the one or more user interest tags based on one or more searches initiated on the U.I. software app relating to the desired travel route and to previously provided travel routes.

15. The method of claim 12, further comprising: generating the one or more user interest tags based on one or more searches initiated on the U.I. software app relating to a user defined activity.

16. The method of claim 12, wherein the first operational dataset received by the A.I. algorithm further includes a subset of the first set of digital media files or the second set of digital media files that have previously been viewed on the U.I. software app.

17. The method of claim 12, wherein the A.I. algorithm is further operable to exclude digital media using historical search records that were recorded by the U.I. software app.

18. The method of claim 12, wherein the first operational dataset received by the A.I. algorithm further includes exclusion tags for prohibiting digital media identified as being unfavorable from being displayed on the U.I. software app.

19. The method of claim 12, wherein the first operational dataset received by the A.I. algorithm further includes a restrictive-content criteria that prohibits explicit material from being stored by the U.I. software app.

20. A trip planning and reservation system, comprising:
a controller operable to:
validate a user account information and provide an access token in response to receiving the user account information on a computing device;
invoke an API gateway that validates the access token as being permitted to access a plurality of digital media files responsive to the computing device receiving the access token;
provide a desired travel route between a first destination and a second destination responsive to the access token being validated by the API gateway;
classify and predict the plurality of digital media files to be displayed on the computing device using an artificial intelligence (A.I.) algorithm that receives operational data that includes the user account information and one or more user interest tags responsive to receiving the desired travel route, wherein each of the plurality of digital media files includes geo-graphic coordinates and data about a location within a pre-defined proximity of the desired travel route, the A.I. algorithm performing classification using a naive bayes classifier, decision tree, random forest, or k-nearest neighbor algorithm; and select a first file from the plurality of digital media files for inclusion within the desired travel route responsive to the plurality of digital media files being on the computing device.

* * * * *